United States Patent
Chen

(10) Patent No.: US 7,616,820 B2
(45) Date of Patent: Nov. 10, 2009

(54) SYSTEM AND METHOD FOR REDUCING DISCONTINUITY OF GRAY LEVEL IN AN IMAGE BUFFER MEMORY

(75) Inventor: Wen-Kuan Chen, ChuTun Cheng (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 332 days.

(21) Appl. No.: 10/909,295

(22) Filed: Aug. 3, 2004

(65) Prior Publication Data
US 2005/0094880 A1  May 5, 2005

(30) Foreign Application Priority Data
Oct. 30, 2003  (TW) .............. 92130225 A

(51) Int. Cl.
G06K 9/36  (2006.01)
(52) U.S. Cl. ..................... 382/232; 708/551
(58) Field of Classification Search ........ 382/266–269, 382/305, 232–253
See application file for complete search history.

(56) References Cited

U.S. PATENT DOCUMENTS

| 4,589,084 A | * | 5/1986 | Fling et al. | ............... 708/551 |
| 5,329,475 A | * | 7/1994 | Juri et al. | ............... 708/551 |
| 5,909,383 A | * | 6/1999 | Lee | ............... 708/313 |
| 2002/0087610 A1 | * | 7/2002 | Pether et al. | ............... 708/551 |

* cited by examiner

Primary Examiner—Brian P Werner
Assistant Examiner—Jayesh Patel
(74) Attorney, Agent, or Firm—Bacon & Thomas, PLLC

(57) ABSTRACT

A system and method for reducing discontinuity of gray level in an image buffer memory is provided, which reduces N bits to (N−k) bits for each pixel on an input image, so as to save required memory and reduce discontinuity of gray level. The input image includes a plurality of pixels in a matrix. The method includes the steps of: selecting a plurality of interleaved pixels from the input image; adding a specific value of $2^{k-1}$ in the pixels selected; and deleting lower k bits for each pixel of the input image.

4 Claims, 2 Drawing Sheets

SYSTEM AND METHOD FOR REDUCING DISCONTINUITY OF GRAY LEVEL IN AN IMAGE BUFFER MEMORY

BACKGROUND OF THE INVENTION

1. Field of the Invention

The present invention relates to the technical field of image buffer memory and, more particularly, to a system and method for reducing discontinuity of gray level in an image buffer memory.

2. Description of Related Art

Image compression and decompression is widely used in video and multimedia applications. In accordance with certain similarity between two adjacent frames of consecutive pictures, image compression can highly increase efficiency of data compression. This is achieved by using motion estimation to omit data where current frame is similar to the nearest preceding frame, and only recording the different ones. Such a compression method is also referred to as a frame-related compression. Image compression is performed in a unit of GOP (group of picture) consisting of three types of I, B and P frames. In general, a GOP has 15 frames: an I-frame at the first position, a P-frame at the second position, two B-frames at the next two positions, and so on. As such, the GOP is composed of a sequence of IPBB PBB PBB. I frame referred to as a full frame is an intra-coded picture which is coded independently without reference to other pictures and provides access point to the coded sequence where decoding can begin, but is coded with only moderate compression; P frame is a predictive-coded picture which is obtained by omitting data of current frame similar to the nearest preceding frame; and B frame is a bidirectionally predictive-coded picture which is obtained by omitting data of current frame similar to that of the nearest preceding and upcoming pictures. P and B frames are not complete frames that require referenced to I frame.

However, with current DRAM standards, DRAMs as image buffers can only have some specified capacities. When regarding cost, data amount of each compressed frame (plus other required information) is still greater than the capacity of a typical DRAM. To reduce the data amount for meeting current DRAM standards, the compressed frames or pictures are further compressed. However, a conventional approach for further compression only processes a half frame of motion picture at a time, thereby adding processing time and reducing entire system efficiency. Another conventional approach is to directly omit 2 bits every 8 bits for each pixel. This can reduce required image memory but the effect of discontinuity of gray level thus presents on image at horizontal direction. Therefore, it is desirable to provide an improved system and method to mitigate and/or obviate the aforementioned problems.

SUMMARY OF THE INVENTION

The object of the present invention is to provide a system and method for reducing discontinuity of gray level in an image buffer memory, which can save required image buffer memory and overcome the prior problem of discontinuity of gray level on image at horizontal direction.

In accordance with one aspect of the present invention, there is provided a method for reducing discontinuity of gray level in an image buffer memory, which reduces N bits to (N−k) bits for each pixel on an input image (N and k are positive integers and N>k), so as to save required memory and reduce discontinuity of gray level. The input image includes a plurality of pixels in a matrix. The method includes the steps of: selecting a plurality of interleaved pixels from the input image; adding a specific value of $2^{k-1}$ in the pixels selected; and deleting lower k bits for each pixel of the input image.

In accordance with another aspect of the present invention, there is provided a system for reducing discontinuity of gray level in an image buffer memory, which reduces N bits to (N−k) bits for each pixel on an input image so as to save required memory (N and k are positive integers and N>k). The input image includes a plurality of pixels in a matrix. The system includes: a pixel selecting means for selecting a plurality of interleaved pixels from the input image; an adder for adding a specific value of $2^{k-1}$ in the pixels selected; and a pixel bit deleting means for deleting lower k bits for each pixel of the input image.

Other objects, advantages, and novel features of the invention will become more apparent from the following detailed description when taken in conjunction with the accompanying drawings.

BRIEF DESCRIPTION OF THE DRAWINGS

FIG. 3 is a schematic view of selected pixels in accordance with the invention; and FIG. 4 is another schematic view of selected pixels in accordance with the invention.

DETAILED DESCRIPTION OF THE PREFERRED EMBODIMENT

To better understanding, preferred embodiments are described in detail in the following.

Figure 1:
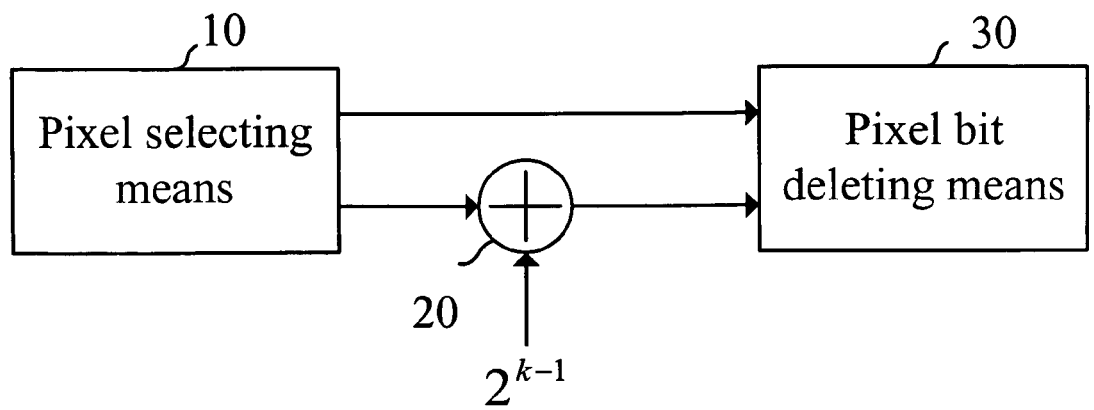
FIG. 1 is a block diagram of a system for reducing discontinuity of gray level in an image buffer memory in accordance with the invention.

FIG. 1 is a block diagram of a system for reducing discontinuity of gray level in an image buffer memory in accordance with the invention. In FIG. 1, the system is provided to reduce N bit to (N−k) bits for each pixel on an input image so as to save required memory (N and k are positive integers and N>k), which includes a pixel selecting means 10, an adder 20 and a pixel bit deleting means 30. As shown, the pixel selecting means 10 selects a plurality of interleaved pixels from the input image. The adder 20 adds a specific value of $2^{k-1}$ to the pixels selected by the pixels selecting means. The pixel bit deleting means 30 deletes lower k bits for each pixel of the input image.

Figure 2:
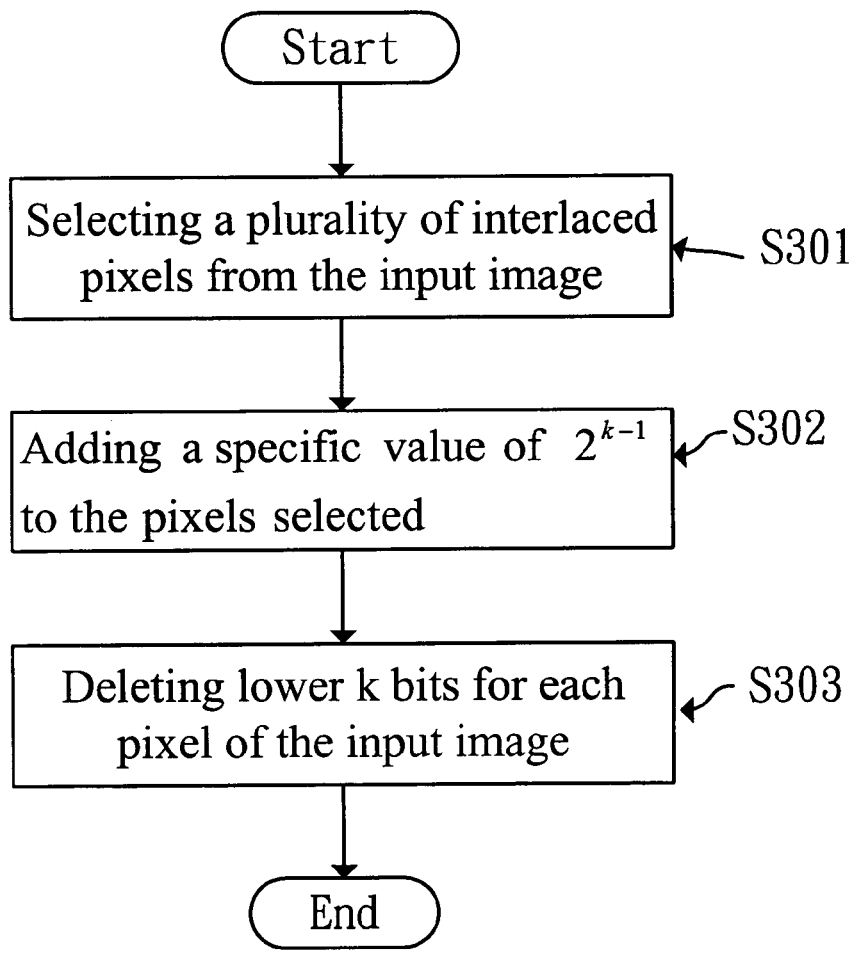
FIG. 2 is a flowchart of a method applied for reducing discontinuity of gray level in an image buffer memory in accordance with the invention.
Figures 3, 4:
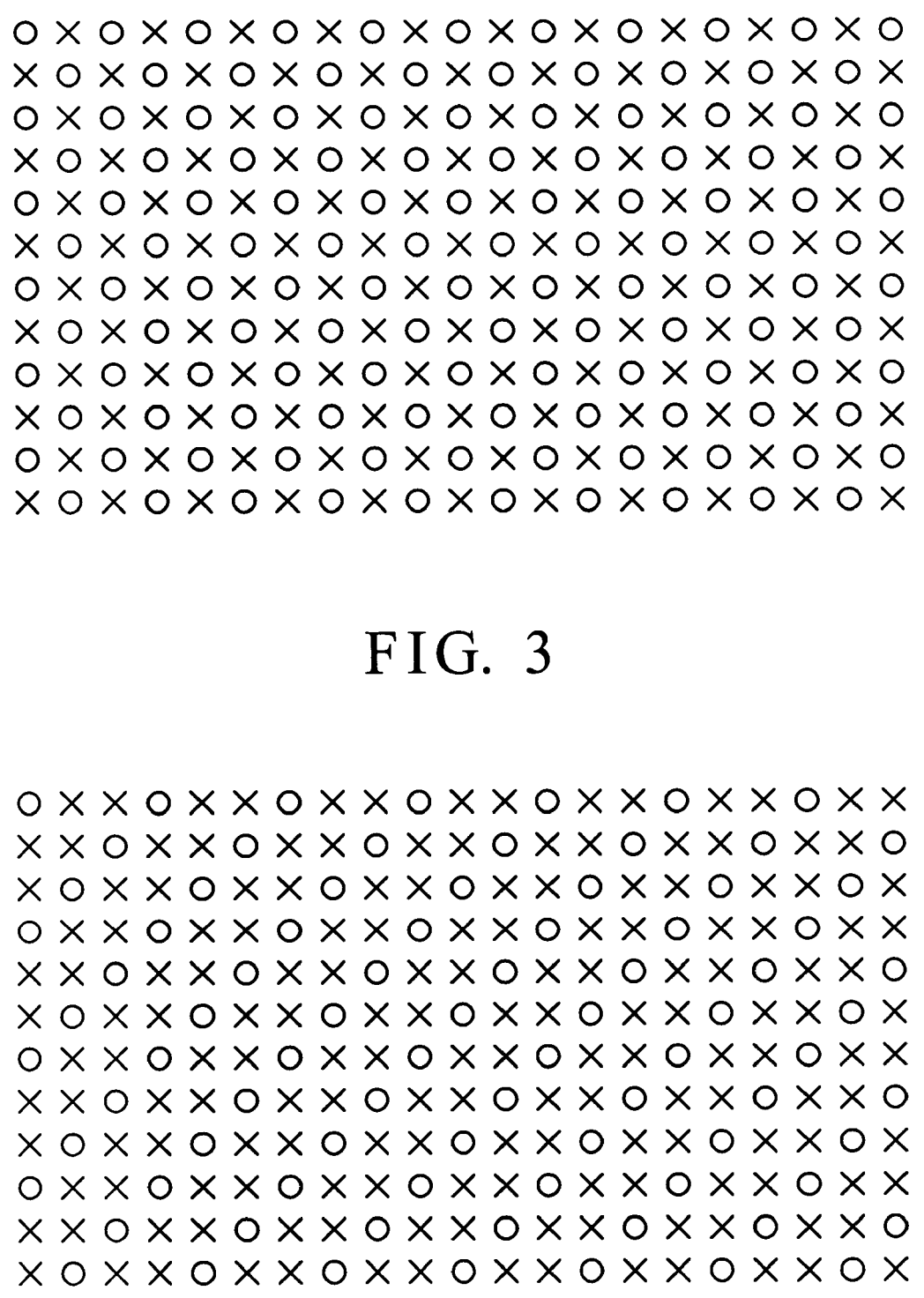

FIG. 2 is a flowchart of a method applied for reducing discontinuity of gray level in an image buffer memory in accordance with the invention. As shown in FIG. 2, the method can reduce N bit to (N−k) bits for each pixel on an input image so as to save required memory. For example, when reducing 8 bits to 6 bits for each pixel, it can save about ¼ of required image buffer memory. The input image includes a plurality of pixels in a matrix. As shown, in step S301, it selects a plurality of interleaved pixels from the input image. For example, those pixels with coordinate (X, 2Y) in the matrix-arranged pixels are selected, where X and Y are non-negative integers, and X is an even number; or those pixels with coordinate (X, 2Y+1) in the matrix-arranged pixels are selected, where X and Y are non-negative integers, and X is an odd number, as shown in FIG. 3 where circles representing the pixels selected from the input image. FIG. 4 is another view of interleaved pixels selected from the input image. As shown, those pixels represented by circles are selected and have coordinate (X, 3Y+0), where X and Y are non-negative integers and X=3 M (M is non-negative integer), or coordinate (X, 3Y+2), where X and Y are non-negative integers and X=3 M+1 (M is non-negative integer), or coordinate (X, 3Y+1), where X and Y are non-negative integers and X=3M+2 (M is non-negative integer).

In step S302, it adds a specific value of $2^{k-1}$ to the pixels selected. For example, if k=2, i.e., to delete 2 bits, and the selected pixel with the value $01110111_b$, then the specific value equals 2 (=$10_b$) is added to the value $01110111_b$. In step S303, it deletes lower k bits for each pixel of the input image. In this case, lower 2 bits for each pixel of the input image are deleted. For example, lower 2 bits of the added value $01111001_b$ of the selected pixel are deleted, then the selected pixel is 6-bit with the value $011110_b$.

In view of the foregoing, it is known that, in the invention a specific value (in this case, 2=$10_b$) is added to pixels selected firstly and is deleted later, which is similar to the round operation in mathematics, not like the prior art to directly delete 2 bits from 8 bits for each pixel (similar to the truncate operation in mathematics). Further, the invention only applies the cited process to the pixels selected, so that vision error generated by the invention can be smaller than that by the prior art, as compared to the original image. Furthermore, the invention can avoid the problem of discontinuity of gray level presented in the prior art.

Although the present invention has been explained in relation to its preferred embodiment, it is to be understood that many other possible modifications and variations can be made without departing from the spirit and scope of the invention as hereinafter claimed.

What is claimed is:

1. A method for reducing discontinuity of gray level in an image buffer memory, which reduces N bits to (N−k) bits for each pixel on an input image stored in said image buffer memory (N and k are positive integers and N>k), so as to save required memory and reduce discontinuity of gray level, the input image including a plurality of pixels in a matrix, the method comprising the steps of:

(A) selecting a plurality of interleaved pixels from the input image stored in said image buffer memory, wherein the pixels selected have coordinate (X, 3Y+0) in the matrix, where X and Y are non-negative integers and X=3 M for M as a non-negative integer; or coordinate (X, 3Y+2), where X and Y are non-negative integers and X=3 M+1 for M as a non-negative integer; or coordinate (X, 3Y+1), where X and Y are non-negative integers and X=3 M+2 for M as a non-negative integer;

(B) adding a specific value of $2^{k-1}$ in the pixels selected from the input image stored in said image buffer memory; and (C) deleting lower k bits for each pixel of the input image stored in said image buffer memory to reduce a size of said image buffer memory required by the image and reduce said discontinuity of gray levels in said image.

2. The method as claimed in claim 1, wherein N=8 and k=2.

3. A system for reducing discontinuity of gray level in an image buffer memory, which reduces N bits to (N−k) bits for each pixel on an input image so as to save required memory (N and k are positive integers and N>k), the input image including a plurality of pixels in a matrix, the system comprising:

a pixel selecting means for selecting a plurality of interleaved pixels from the input image, wherein the pixels selected by the pixel selecting means have coordinate (X, 3Y+0) in the matrix, where X and Y are non-negative integers and X=3M for M as a non-negative integer; or coordinate (X, 3Y+2), where X and Y are non-negative integers and X=3 M+1 for M as a non-negative integer; or coordinate (X, 3Y+1), where X and Y are non-negative integers and X=3 M+2 for M as a non-negative integer;

an adder for adding a specific value of $2^{k-1}$ in the pixels selected; and a pixel bit deleting means for deleting lower k bits for each pixel of the input image.

4. The system as claimed in claim 3, wherein N=8 and k=2.

* * * * *

UNITED STATES PATENT AND TRADEMARK OFFICE
CERTIFICATE OF CORRECTION

PATENT NO.        : 7,616,820 B2                                         Page 1 of 1
APPLICATION NO.   : 10/909295
DATED             : November 10, 2009
INVENTOR(S)       : Wen-Kuan Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Nineteenth Day of October, 2010

David J. Kappos
*Director of the United States Patent and Trademark Office*